United States Patent
Matsuoka

[19]

[11] Patent Number: 6,045,731
[45] Date of Patent: Apr. 4, 2000

[54] GUIDE MEMBER AND METHOD FOR INTEGRAL FOAM MOLDING

[75] Inventor: Chikara Matsuoka, Tamano, Japan

[73] Assignee: Namba Press Works Co., Ltd., Kurashiki, Japan

[21] Appl. No.: 08/793,148

[22] PCT Filed: May 30, 1996

[86] PCT No.: PCT/JP96/01469

§ 371 Date: Jan. 30, 1997

§ 102(e) Date: Jan. 30, 1997

[87] PCT Pub. No.: WO96/41707

PCT Pub. Date: Dec. 27, 1996

[30] Foreign Application Priority Data

Jun. 9, 1995 [JP] Japan ................................. 7-167137

[51] Int. Cl.[7] .................................................. B29C 44/12
[52] U.S. Cl. ................... 264/46.4; 249/91; 264/271.1; 264/276; 264/278; 425/117; 425/127
[58] Field of Search ....................... 264/275, 276, 264/278, 46.4, 271.1; 425/117, 127; 249/91

[56] References Cited

U.S. PATENT DOCUMENTS

| | | | |
|---|---|---|---|
| 4,673,542 | 6/1987 | Wigner et al. | 264/275 |
| 4,802,939 | 2/1989 | Billarant et al. | 264/46.4 |
| 4,814,036 | 3/1989 | Hatch | 264/276 |
| 4,881,997 | 11/1989 | Hatch | 264/46.4 |
| 4,933,035 | 6/1990 | Billarant et al. | 264/46.4 |
| 5,234,639 | 8/1993 | Smith | 264/276 |
| 5,259,905 | 11/1993 | Gilcreast | 264/46.4 |
| 5,286,431 | 2/1994 | Banfield et al. | 264/46.4 |
| 5,306,735 | 4/1994 | Harada et al. | 521/78 |
| 5,342,569 | 8/1994 | Murasaki | 264/276 |

FOREIGN PATENT DOCUMENTS

| | | | |
|---|---|---|---|
| 61-57318 | 3/1986 | Japan | 264/46.4 |
| 5-220764 | 8/1993 | Japan . | |

*Primary Examiner*—Allan R. Kuhns
*Attorney, Agent, or Firm*—Renner, Kenner, Greive, Bobak Taylor & Weber

[57] ABSTRACT

According to the invention, a novel guide member for integrally forming the fastening parts with the urethane mold and an integral molding method using the guide member are provided. The guide member includes a guide body that has an extended body which includes concave cross-section and at least one open end (4, 7), and isolation members (5, 6) provided near the ends of said guide portion. The isolation members are detachable, and by engaging with the fastening surface of the fastening parts, they effectively block any seepage of liquid foaming raw material. With the integral forming method using said guide member of the invention, it is possible to embed the ends of the fastening parts within the urethane molding and to improve its peeling strength at low cost.

18 Claims, 4 Drawing Sheets

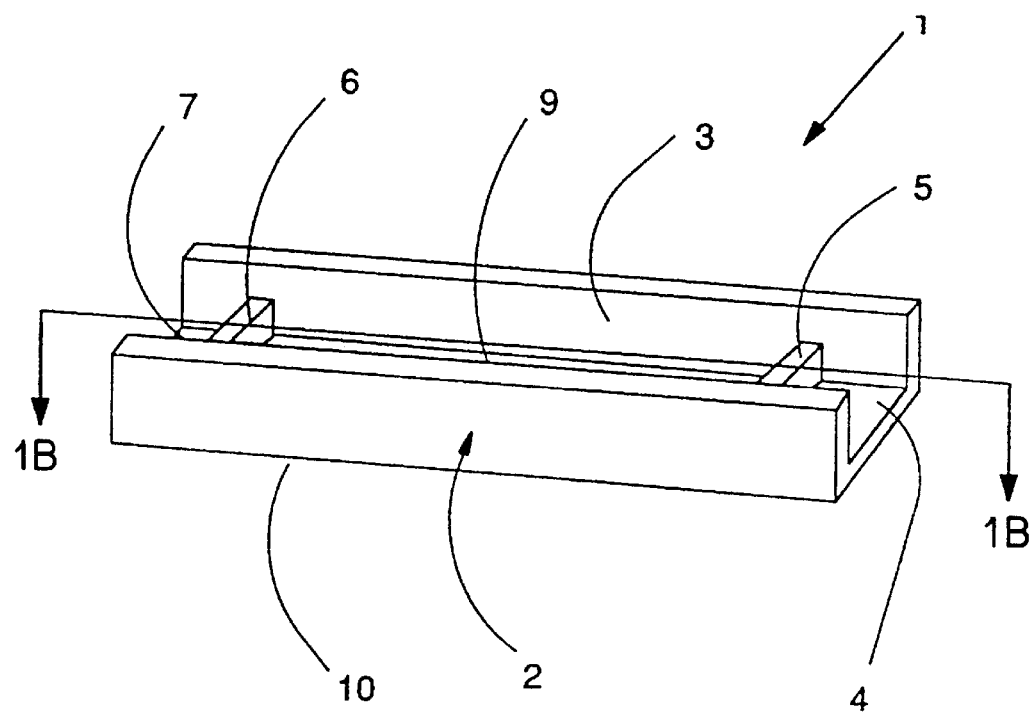
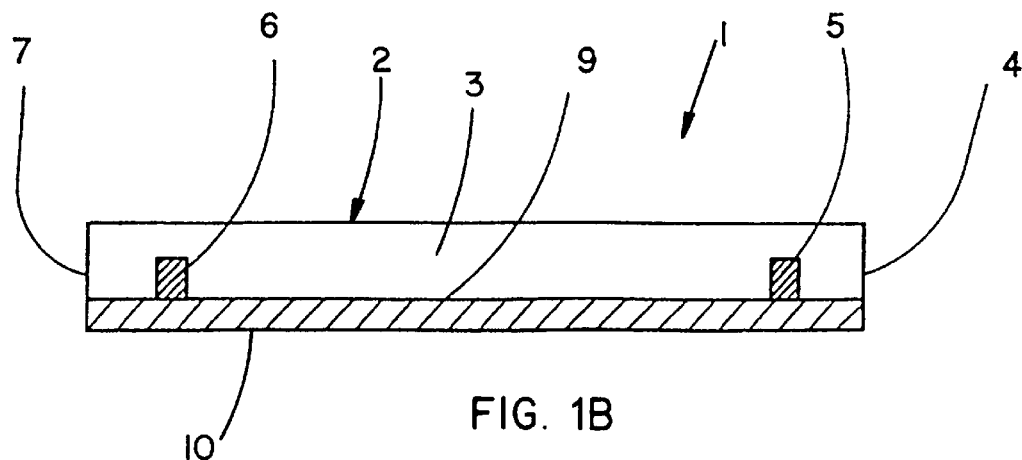

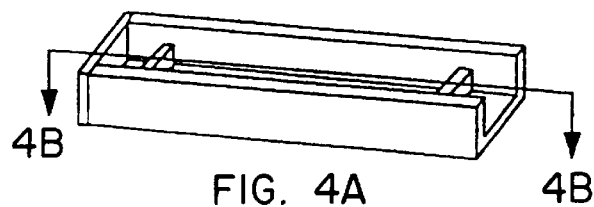
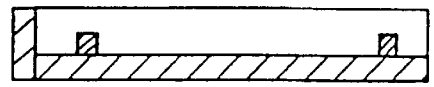
FIG. 4A     FIG. 4B
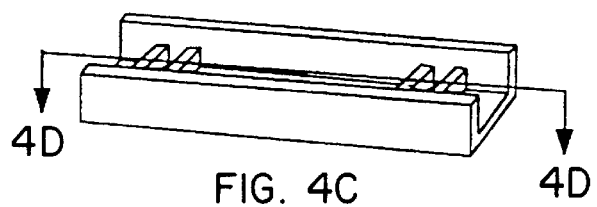
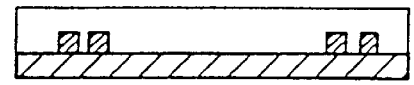
FIG. 4C     FIG. 4D
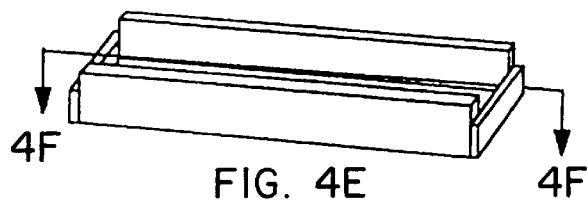
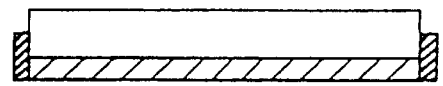
FIG. 4E     FIG. 4F
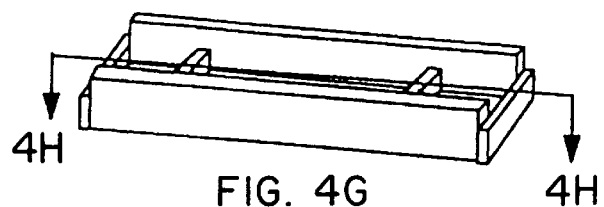
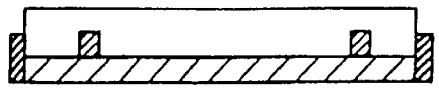
FIG. 4G     FIG. 4H

といった6,045,731

GUIDE MEMBER AND METHOD FOR INTEGRAL FOAM MOLDING

TECHNICAL FIELD

The invention concerns a member for integrally forming a foam material such as urethane; specifically, it concerns a guide member for adhesively fixing a fastening part to a urethane molding.

BACKGROUND ART

Cushion material in which the covering material is put onto urethane is generally used in seats in automobiles and other vehicles and aircraft, in chairs for home or office use, or in door linings or interior appointments. The urethane and covering material are usually put together detachably using a fastening part that is fixed to a urethane molding.

In order to provide fastening parts on the urethane surface inexpensively and stably, the integral forming of urethane and fastening parts has been implemented. In the prior art, the fastening parts are previously covered so that the liquid foaming raw materials do not adhere to the surface of the fastening parts, then the liquid foaming raw material is flowed in, and thereafter portions to which the material is attached are cut away.

With the conventional method, in order to prevent the liquid foaming raw material from adhering to the fastening surface, it has been necessary to pre-manufacture guide members which are the same length as each fastening part and fit into a urethane metal mold. That is, the guide member must be remade for each desired length of fastening part, which causes an increase in the fabrication time and cost. In addition, additional equipment is needed for each fastening part to prevent the liquid foaming raw material from flowing onto the fastening surface, which results in increasing of the cost and the number of operating processes. Another drawback of the conventional method is that because the fastening part has a relatively low peeling strength, the covering material of the cushion material easily peels off.

Thus the purpose of the invention is to provide a novel guide member that reduces cost and the number of processes.

Another purpose of the invention is to provide a novel guide member that effectively cuts off the seepage of liquid foaming raw material onto the fastening surface.

A further purpose of the invention is to provide an integral molding method that improves the peeling strength of the fastening part.

DISCLOSURE OF THE INVENTION

In order to achieve the above purposes, the invention comprises the following means.

According to the invention, the guide member for forming the fastening part integrally with the urethane molding has a longitudinally extended body that has a concave cross-section and at least one open end. The surface of its inner walls contact with side surfaces of said fastening part to prevent the flow of liquid foaming raw material to the fastening surface.

In addition, to prevent said liquid foaming raw material from seeping into the fastening surface of the interior of said guide member, said guide member may also include at least one isolation member near at least one of its ends. The isolation member is provided such that it engages with the fastening surface of said fastening part.

Moreover, the height of the inner wall of the guide member of the invention may be formed so that it is higher than the height of the fastening parts.

The isolation member is preferably a detachable thin plate made of spring material, and said guide member is preferably made of aluminum or aluminum alloy.

The method of the invention for integrally forming a fastening part with the urethane mold, comprises the steps of:

setting the isolation member to the desired position on the fastening part;

attaching said fastening part to said guide member so that it extends outwardly from at least one end of said guide member;

fixing said guide member to the urethane metal mold;

flowing liquid foaming raw material into said urethane metal mold; and removing said guide member and said isolation member after a predetermined time.

BRIEF DESCRIPTION OF THE DRAWINGS

FIG. 1A is a preferred embodiment of the guide member of the invention shown in perspective and show in an elevational cross-sectional view in the longitudinal direction in FIG. 1B taken substantially along the line 1B—1B of FIG. 1A.

FIG. 4A is another embodiment of the guide member of the invention having the isolation members of FIG. 1 with an end sealed off;

FIG. 4B is a longitudinal sectional view taken substantially along the line 4B—4B of FIG. 4A;

FIG. 4C is another embodiment of guide member with double isolation members;

FIG. 4D is a longitudinal sectional view taken substantially along the line 4D—4D of FIG. 4C;

FIG. 4E is another embodiment of guide member with weirs at both ends;

FIG. 4F is a longitudinal sectional view taken substantially along the line 4F—4F of FIG. 4D;

FIG. 4G is another embodiment of the guide member having the isolation members of FIG. 1 and the weir members of FIG. 4E; and FIG. 4H is a longitudinal sectional view taken substantially along the line 4H—4H of FIG. 4G.

BEST MODE FOR CARRYING OUT THE INVENTION

Figure 2A:
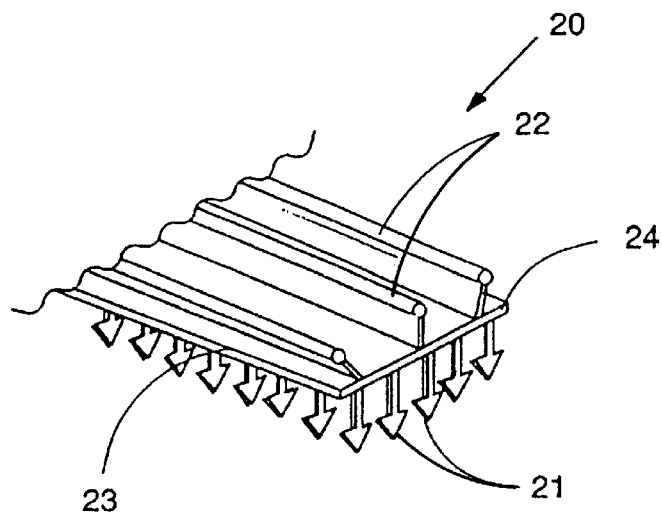
FIG. 2A shows the fastening part of the invention.

Hereinafter, embodiments of the invention are described in detail, making reference to the drawings.

FIG. 1 is a preferred embodiment of the guide member 1 of the invention. Guide member 1 for integral molding of the fastening parts with the urethane molding comprises guide portion 2, which has an longitudinally extended body having a concave cross-sectional opening at ends 4 and 7, and isolation members 5 and 6 positioned somewhat inwardly from said ends 4 and 7 so as to be perpendicular to longitudinal axis.

Said guide portion 2 is preferably made of aluminum or aluminum alloy and is manufactured by extrusion molding or injection molding. The longitudinal length of the guide portion varies depending on that of the fastening part and the structure of the cushion material, but the height of inner wall 3 is preferably 6–8 mm.

The width of the inner side of the guide member is substantially equal to the width of the fastening part, so that when the fastening part is attached, the side surface of the fastening part and the inner side surface 3 of the guide member are contacted tightly. Also, a bottom surface 10 of guide member 1 is completely flat so as to be fixed firmly to the urethane metal mold.

The isolation members 5 and 6 are preferably thin plates made of spring material, alternatively they may be in the shape of the letter C. They may also be made from any other materials that do not easily deform and degrade. The isolation members 5 and 6 are preferably located detachably to the inner wall surface of the guide member, and they may be fixed at a predetermined position. The plate thickness of said isolation members 5 and 6 is preferably 0.2 mm. Their height is preferably 1.5 mm, corresponding to the height of the stem of the fastening part.

FIG. 2 shows how the fastening part is attached to the guide member of the invention. FIG. 2(A) shows a conventional fastening part 20 comprising stems 21, base 23, and anchor portions 22 which extend parallel in the longitudinal direction.

Figure 2B:
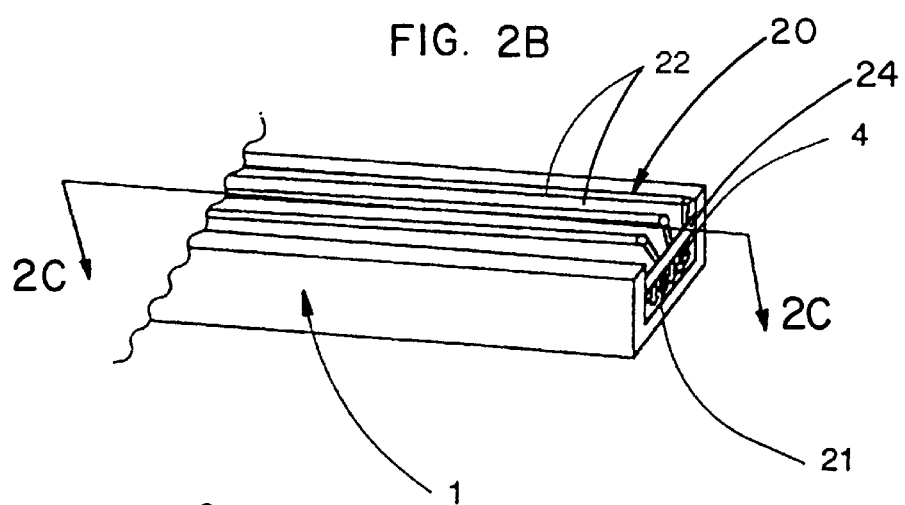
FIG. 2B is a fragmentary perspective view of the fastening part positioned in relation to the guide member of FIG. 1A.

FIG. 2(B) is a perspective view showing how fastening part 20 is attached to guide member 1 of the invention. The fastening part is not easily dislocated, because inner side surface 3 of the guide member 1 firmly contacts the side surface of base 23 of fastening part 20 or the side surface of anchors 22. The inner side surface 3 of the guide member 1 functions to prevent the flow of liquid foaming raw material to stems 21 when said liquid foaming raw material flows from above in the drawing. In the drawing, end 24 of the fastening part substantially coincides with end 4 of the guide member 1, but it is preferable to set it somewhat inwardly in consideration of the expansion of the fastening part due to the heat of reaction. The height of inner wall 3 of the guide member 1 is preferably the same as that of fastening part 20. Alternatively, the height of inner wall 3 may be higher than that of fastening part 20. In that case, a narrow groove (not shown) is formed in both sides of the fastening parts on the urethane when it is integrally formed. These narrow grooves allow the fastening part, although anchored in the urethane, to flexibly accommodate the movements of the user.

Figure 2C:
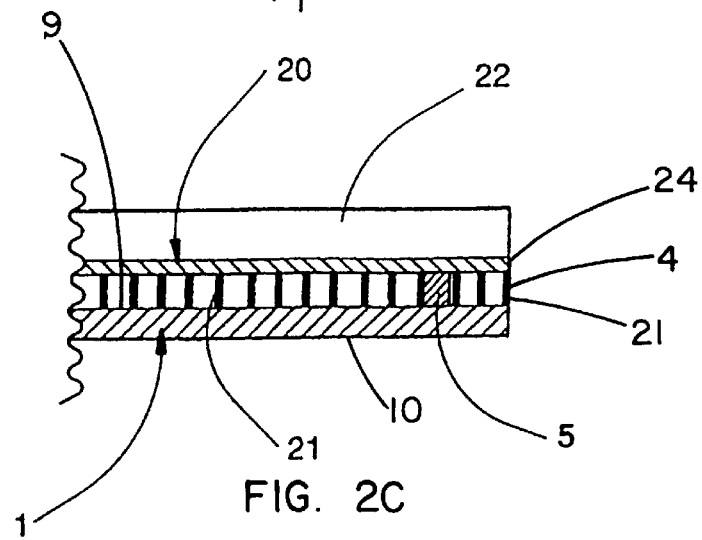
FIG. 2C is a fragmentary sectional view taken substantially along the line 2C—2C of FIG. 2B.

FIG. 2(C) is a longitudinal cross-sectional view of FIG. 2(B). The isolation member 5 of the guide member of the invention is provided somewhat inwardly from a guide end 4. The thickness of the isolation member is preferably 0.2–0.4 mm, which is about half of the distance from one stem to the next stem (0.5–0.7 mm), and its height is substantially equal to that of stems 21 (1.5 mm). Because of this structural feature, the isolation member of the invention can be engaged between the rows of the stems as shown in the drawing. The isolation member preferably can move freely and is detachable so that it can be put in any desired position on stem surface 21 of fastening part 20. The isolation member 5 functions to effectively prevent foaming raw material from penetrating through guide end 4 and to completely isolate the interior region of the isolation member from its exterior. The drawing shows only one side of the guide member, but it should be noted that the end on the other side is similar.

Figure 3:
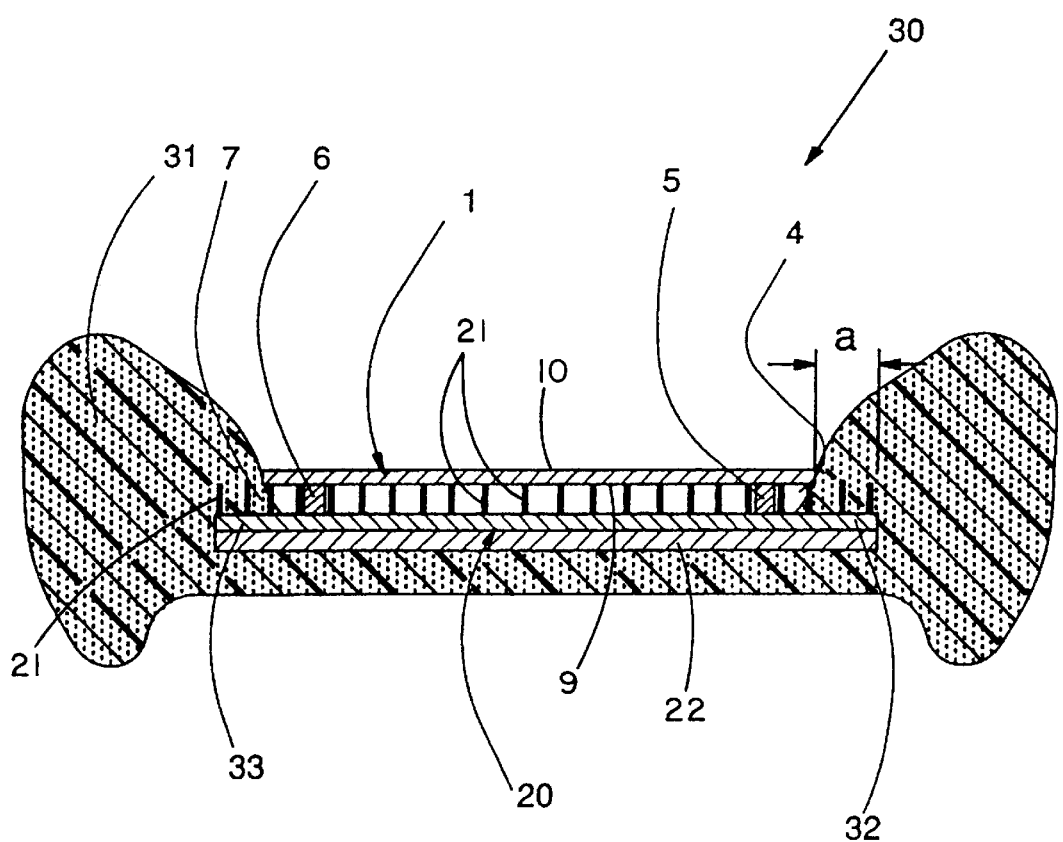
FIG. 3 is an elevational cross-sectional view of cushion material produced by the integral molding method of the invention.

FIG. 3 is a longitudinal cross-sectional view of cushion material manufactured by an integral molding method using the guide member of the invention. According to the method of the invention, as the first step, said isolation members 5 and 6 are engaged in predetermined position on stem 21 of said fastening part 20. As the second step, it is attached to the interior of said guide member so that ends 32 and 33 of said fastening part 20 respectively protrude from ends 4 and 7 of said guide member 1 of the invention. As the third step, bottom surface 10 of guide member 1 is fixed firmly to the urethane metal mold (not shown). Finally, liquid foaming raw material is flowed into said urethane metal mold and is allowed to foam, and thereby urethane molding 31 and fastening part 20 are formed integrally. Thereafter, guide member 1 and isolation members 5 and 6 are removed.

When the foaming raw material is flowed on the bottom surface of the fastening part 20 within the guide member 1 and it foams, the anchor portions 22 are inserted into the foam, anchoring the fastening part 20 to the foam. Protruding portions 32 and 33 of fastening part 20 become embedded into the urethane mold by length a. The length of embedded portion can be adjusted, and either one side or both sides of said fastening parts can be embedded. According to the invention, the end portions 32, 33 of the fastening part 20 of the cushion material are embedded into the urethane molding, thereby it does not easily peel off. Therefore, it is an advantage that the fastening part 20 of the invention has higher peeling strength than prior art.

With the guide member 1 of the invention, the peeling strength can be also improved without embedding the fastening part 20 into the urethane molding. If isolation members 5 and 6 are respectively located inwardly from each ends of guide member 1 of the invention, liquid foaming raw material can be completely cut off by the isolation members 5 and 6 after a little penetration. As a result, only the surface near both ends of the fastening part 20 is covered with foam, making it harder to peel off. The peeling strength in this case can be adjusted by a location of the isolation members 5, 6.

By the aforementioned method, not only the need for additional parts but also the need for operations such as strict scaling of the length of the guide member 1 to the length of a fastening part 20 are eliminated, thereby production costs can be greatly reduced.

FIG. 4 shows another embodiment of the guide member of the invention. FIG. 4(A) is a guide member whose only one side is opened and the other side end is sealed off with a wall with respect to the guide member 1 of the preferred embodiment of the invention shown in FIG. 1. FIG. 4(C) shows another embodiment which includes double isolation members of the preferred embodiment of the invention. FIG. 4(E) shows another embodiment which includes a weir board made of the same material as said isolation member and provided on both end surfaces of the guide portion, instead of the isolation member of the preferred embodiment. FIG. 4(G) shows another embodiment which includes the isolation members of the preferred embodiment and the weir boards of FIG. 4(E), wherein the preferred embodiment is combined with the embodiment of FIG. 4E.

It will be clear to one skilled in the art that other various guide member structures are possible by combinations or variations of the above embodiments.

The guide member of the invention eliminates the need for any additional equipment or additional processes and makes it possible to effectively prevent the seepage of liquid foaming raw material onto the fastening surface.

According to the integral molding method of the invention using said guide member 1 of the invention, the need for any additional equipment or the need for a strict scaling process are completely eliminated, thereby it is possible to easily provide fastening parts with high peeling strength.

As a result, production costs of cushion material are greatly reduced, and throughput is greatly improved.

I claim:

1. A guide member for integrally forming a urethane foam molding with a fastening part having a base with projecting stems forming a fastening surface and having anchors comprising, a guide portion having a longitudinally extending body that has a concave cross-section forming a bottom surface joining a pair of spaced inner wall surfaces and at least one open end, and the guide member accommodates the fastening part so that the side surfaces of the base of the fastening part contact said inner wall surfaces of said guide portion to prevent the flow of foam to the fastening surface and so that the stems of the fastening part contact said bottom surface of said guide portion.

2. A guide member as described in claim 1 wherein said guide member is made of aluminum or aluminum alloy.

3. A guide member for integrally forming a fastening part with a urethane molding comprising, a guide portion having a longitudinally extending body that has a concave cross-section forming a bottom surface joining a pair of spaced inner wall surfaces and at least one open end, and the guide member accommodates said fastening part so that the side surface of said fastening part contacts said inner wall surfaces of said guide member, said guide member further including at least one isolation member provided near at least one end of said guide member and contacting said bottom surface, said inner wall surfaces and said fastening part so as to prevent the seepage of said liquid foaming raw material into said guide member.

4. A guide member as described in claim 3 wherein said isolation member is a thin plate made of spring material.

5. A guide member as described in claim 4 wherein said guide member is made of aluminum or aluminum alloy.

6. A guide member as described in claim 3 wherein said guide member is made of aluminum or aluminum alloy.

7. A guide member for foaming urethane into a molded article with an integral fastening part having a base with projecting stems and anchors comprising, a guide portion having a longitudinally extending body that has at least one open end and a concave cross-section forming a pair of spaced inner wall surfaces that engage the base of a fastening part positioned therein to prevent passage of urethane therebetween to the stems during foaming, and an isolation member positioned proximate each said open end and contacting said inner wall surfaces to prevent passage of the foaming urethane to the stems in said guide portion.

8. A guide member as described in claim 7 wherein the height of said inner wall surfaces is higher than the height of a fastening part.

9. A guide member as described in claim 8 wherein said guide member is made of aluminum or aluminum alloy.

10. A guide member as described in claim 8 wherein said isolation member is a thin plate made of spring material.

11. A guide member as described in claim 10 wherein said guide member is made of aluminum or aluminum alloy.

12. A guide member according to claim 7, wherein said isolation member is removable for selective positioning longitudinally of said guide portion.

13. A guide member according to claim 7, wherein said inner wall surfaces are joined by a bottom surface, said isolation member being sized to contact said inner wall surfaces, said bottom surface and the base of the fastening part.

14. A guide member according to claim 13, wherein said isolation member is sized to fit between the stems on the fastening part at different positions.

15. A method for integrally forming a fastening part with a urethane molding, comprising the steps of:

setting an isolation member to a desired position between stems of the fastening part;

attaching said isolation member within spaced inner wall surfaces of a guide member with the fastening part extending outwardly from at least one end of said guide member;

fixing said guide member to a urethane metal mold;

flowing liquid foaming raw material into said urethane metal mold; and removing said guide member and said isolation member after a predetermined time.

16. A method for foaming urethane in a mold into a molded article with an integral fastening part comprising the steps of:

constructing a fastening part having a base with oppositely projecting stems and anchors, setting one or more isolation members at predetermined positions between stems of said fastening part, locating said isolation members and said fastening part interiorly of a guide member forming a bottom surface joining a pair of spaced inner wall surfaces, with said base of said fastening part, said bottom surface and said inner wall surfaces of said guide member and said isolation members enclosing said stems of said fastening part, fixing said guide member to the mold, flowing foaming urethane into the closed mold, and removing said guide member and said isolation members after completion of the foaming of the urethane.

17. A method according to claim 16, further comprising the steps of:

constructing said fastening part of a greater length than the length of said guide member, locating said fastening part relative to the guide member so that at least one end of said fastening part protrudes from one end of said guide member, whereby said one end of said fastening part is embedded in foamed urethane to provide improved peeling strength.

18. A method according to claim 16, further comprising the steps of:

selecting the positions of at least one of said isolation members a predetermined distance inwardly of one end of said guide member, whereby said one end of said fastening part is embedded in foamed urethane to provide improved peeling strength.

* * * * *